United States Patent [19]
Crepeau et al.

[11] 4,139,149
[45] Feb. 13, 1979

[54] DISPLAY SYSTEM

[75] Inventors: Philip C. Crepeau, San Diego; Masami S. Kaino, Del Mar, both of Calif.

[73] Assignee: NCR Corporation, Dayton, Ohio

[21] Appl. No.: 829,556

[22] Filed: Aug. 31, 1977

[51] Int. Cl.² .................. G06K 15/00; G09F 3/20; B65G 47/00
[52] U.S. Cl. .................. 235/383; 340/152 R; 364/400; 40/5; 214/16.4 R
[58] Field of Search .................. 40/28, 3, 5; 214/16.4 A; 186/1 A, 1 B; 340/149 A, 147 A, 152; 364/415, 518, 401, 400; 358/93; 235/378, 375, 383, 385

[56] References Cited
U.S. PATENT DOCUMENTS

| | | | |
|---|---|---|---|
| 3,387,269 | 6/1968 | Hernan | 340/152 R |
| 3,637,989 | 1/1972 | Howard | 235/383 |
| 3,988,570 | 10/1976 | Murphy | 364/400 |
| 4,002,886 | 1/1977 | Sundelin | 235/383 |

Primary Examiner—Robert M. Kilgore
Attorney, Agent, or Firm—J. T. Cavender; Edward Dugas; Stephen F. Jewett

[57] ABSTRACT

A retail store having a computer, point-of-sale terminals, and product code readers at the point-of-sale terminals, includes an electronic price display system. The display system has plural display units, with one display unit at each of the locations in the store where items are held for sale. The computer controls both the prices which are displayed by the display units and the prices which are charged to customers at the point-of-sale terminals. The display units are connected in electrical series by a data transmission line, and price information is transmitted by the computer over the transmission line to the display system in the same order as the display units are connected.

12 Claims, 2 Drawing Figures

DISPLAY SYSTEM

BACKGROUND OF THE INVENTION

The present invention relates to a display system for displaying the price of merchandise in a store, and in particular, to a display system for use in a store having a computer, point-of-sale terminals, and product code readers at the point-of-sale terminals.

Systems employing product codes and point-of-sale terminals having automatic readers for reading such product codes have been proposed for use in retail stores in order to reduce labor costs associated with marking a price on each item of merchandise and with manually entering the price at the point-of-sale terminals. Such systems have not, however, gained widespread acceptance. Consumers have objected to such systems because each item of merchandise is marked with a code rather than a price, and they are thus unable to compare the actual charged price with a marked price. As a consequence, retailers have not accepted such systems because the electronic equipment involved is expensive, and since it is necessary to continue to manually mark prices on merchandise to please consumers, there is not a sufficient savings in labor costs to warrant the purchase of such systems.

It has been proposed to use electronic price displays in association with product code systems of the type described above. U.S. Pat. No. 4,002,886 entitled "Electronic Price Display Unit", issued to Ronald Murl Sundelin, discloses electronic display units that are located throughout a store, adjacent the items for sale, and that are connected to the computer controlling the price charged to the consumer. The display units are connected in parallel to the data lines from the computer and each must have a distinct address code and circuitry which will accept pricing information from the computer only when accompanied by that address code. The computer must therefore transmit both pricing information and the address code of the display unit at which the pricing information is to be displayed. While such a system overcomes some of the problems mentioned above, by assuring the consumer that the price displayed is the same as that which is charged to the consumer, the requirement of an address code to each display has added to the expense of such systems, since it is necessary to program each display unit in advance with its distinct address and to incorporate the additional circuitry within the display unit so that it receives only properly addressed signals.

SUMMARY OF THE INVENTION

A display system in accordance with the present invention may be used in a retail store system having a computer, point-of-sale terminals and product code readers at the terminals. The display units in the display system are connected to the computer so that the prices charged to the consumer are the same prices which are displayed by the display units at the locations where items of merchandise are offered for sale.

The display units in the display system are connected along a data transmission line in electrical series and are adapted to receive a series of signals from the computer in the same order as the display units are arranged. When the computer has transmitted the prices or other data for all display units, each display unit will have received its signal and will display the proper price in response to its signal.

In the disclosed display system, each display unit includes a shift register having a data input, a clock input, and a group of data outputs. The last data output of the shift register is connected to the input of the shift register of an adjacent display unit and the other data outputs are connected to an alphanumeric display device. The computer transmits the signal conveying the data to be displayed at each display unit in the form of binary coded pulses and synchronously transmits clock pulses to shift the data pulses down the transmission line through all of the shift registers. When the shifting ends, each shift register will store a group of pulses representing data to be displayed at its associated alphanumeric display device.

Because the display units are connected in series and the computer transmits the signals conveying the data for each display unit in the same order as the display units are connected, there is need for neither an address code with each signal nor circuitry within each display unit for receiving a proper address code before the display unit will accept the signal.

It is therefore an object of the present invention to provide a display system having plural electronic display units connected in electrical series.

A further object of the present invention is to provide such a display system without the need of programming each display unit with a distinct address code.

It is still a further object of the present invention to provide such a display system where a computer operating the system need not transmit an address code with the information to be displayed at each display unit.

DESCRIPTION OF THE PREFERRED EMBODIMENT

Figure 1:
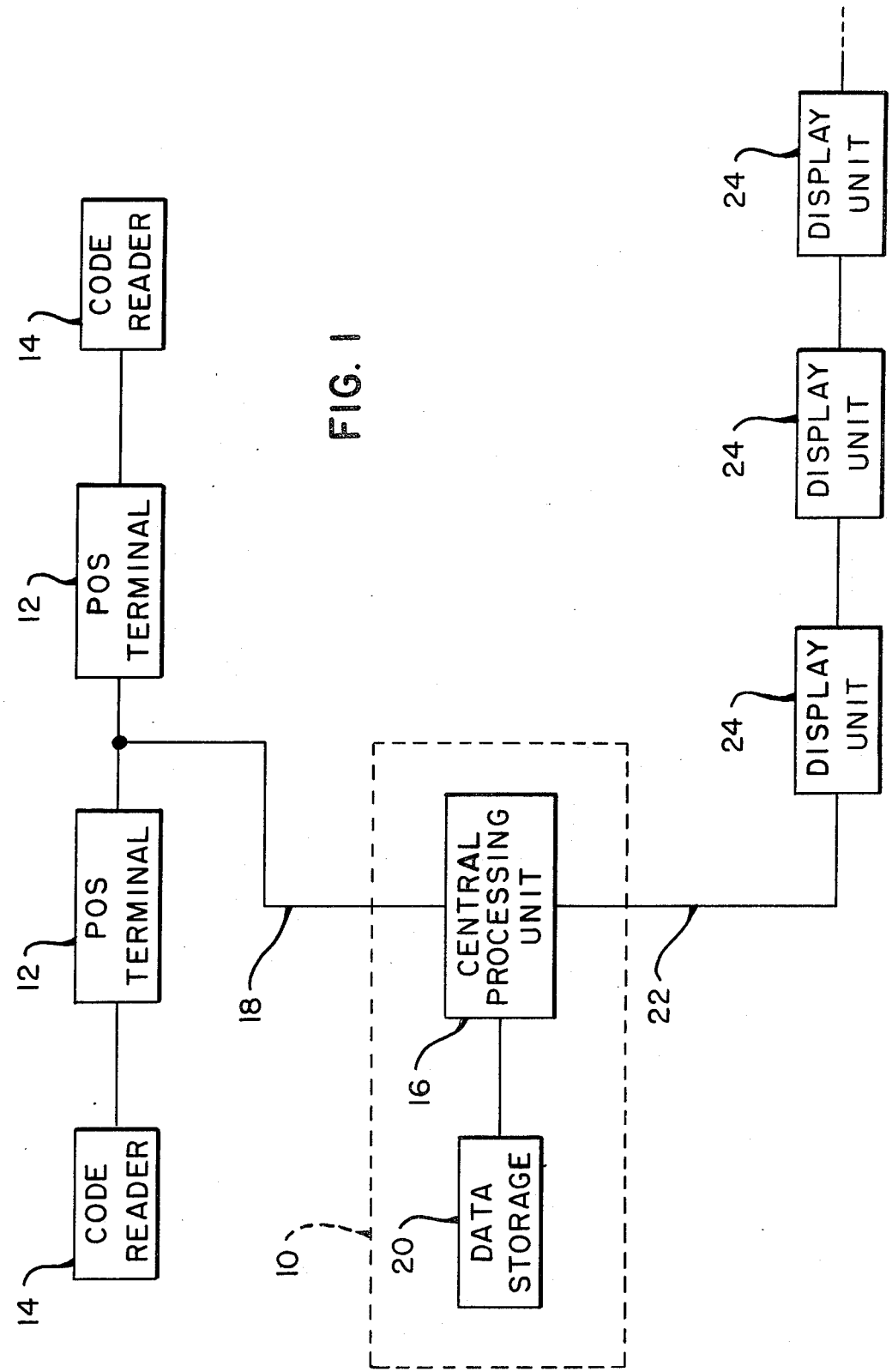
FIG. 1 is a block diagram showing a display system in accordance with the present invention, as used in a retail store system having a computer, point-of-sale terminals, and product code readers at the point-of-sale terminals.

Turning now to the drawings, FIG. 1 illustrates a retail store system that includes a computer 10, plural point-of-sale (POS) terminals 12, and a product code reader 14 at each of the POS terminals 12. The computer 10 will operate each of the POS terminals 12, and as illustrated in FIG. 1, will generally include a central processing unit (CPU) 16, which is connected to the POS terminals by a transmission line 18, and a data storage or memory device 20. The storage device 20 may include a magnetic disk or drum for storing coded prices of each item of merchandise in the store. The product code reader 14 may be an optical scanner or any other conventional device for reading product codes marked on each item in the store.

The system as thus far described, and its operation, are well known in the art. Normally, a customer will walk through the store, selecting at various locations the items of merchandise he wishes to purchase and will carry the selected items to a POS terminal. A sales clerk at the POS terminal operates the code reader 14, and the coded information on the merchandise is transmitted from the POS terminal to the CPU 16. In response to each code, the CPU 16 interrogates the storage device 20 to obtain the price corresponding to the product code. The CPU will also total the prices of all the items purchased, and perform any other needed operations, such as controlling a device (not shown) for printing a customer receipt and computing the amount of any change to be returned to the customer.

As illustrated in FIG. 1, the CPU 16 is also connected by a data transmission line 22 to plural display units 24. Each of the display units 24 will be associated with a type of item of merchandise available in the store and will be located adjacent to such item so that the data displayed by the display unit can be seen by the customer when purchasing the item. Each display unit 24 will display the price of its associated item and, although not illustrated, may, if desired, also display other data, such as the name of the item, its size, or an identifying code number. Although only three of the display units 24 are illustrated in FIG. 1, it should be appreciated that in a typical store, for example a grocery store, there may be a thousand or more of the display units 24. The display units 24 are connected to the CPU 16 of the computer 10 such that the data used to charge the customer for items purchased at the POS terminal is the same data used and displayed by the display units 24.

In accordance with the present invention, the display units 24 are connected in electrical series along the data transmission line 22. By means which are well known to those skilled in the art, the CPU 16 may be programmed to transmit signals conveying data for each of the display units 24 in the same order as the display units are connected. Thus, for example, at the beginning of a business day, when the store management desires to update the prices displayed by the display units, the CPU 16 will cause information relating to each item for which there is a display unit to be transmitted along the line 22 through the display units. The information, which may be in the form of pulses, is arranged so that the first group of pulses transmitted are associated with the last display unit in the series along line 22. The next group of pulses is associated with the second last display unit in the series, and so on, until all pulses have been transmitted and each display unit ends up with its proper group of pulses and displays the data pertaining to its associated item of merchandise.

Although FIG. 1 illustrates only a single series of display units along the line 22, in practice there may be several data transmission lines in the display system, with a plurality of display units connected in series along each of the lines. In such a system, the CPU 16 sends properly arranged signals or pulses along each line for the display units in that line.

Figure 2:
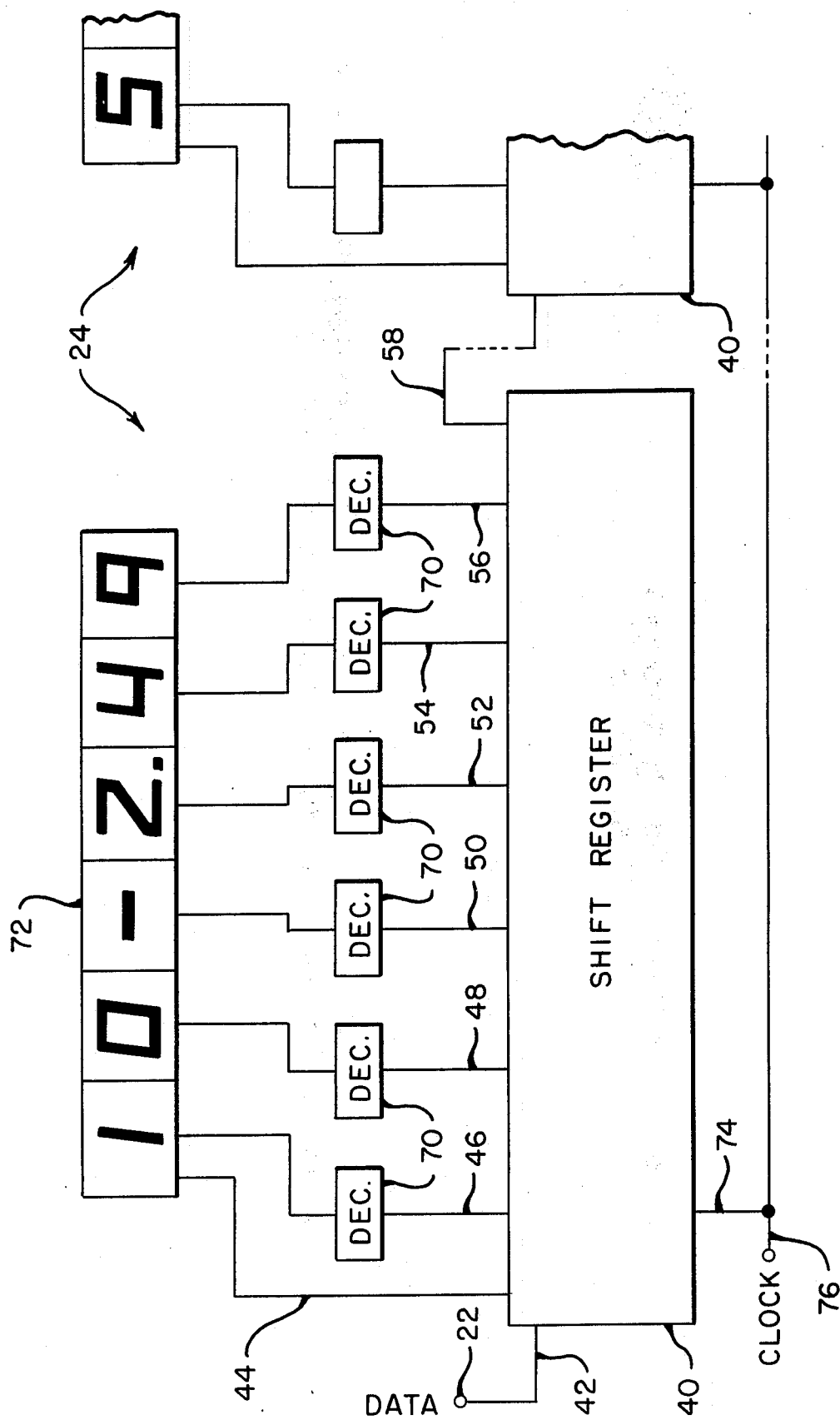
FIG. 2 is a block diagram showing the components of the display units illustrated in FIG. 1.

The components of each display unit 24 are illustrated in FIG. 2. The display unit 24 is seen to include a shift register 40 having a data input 42 and plural data outputs 44, 46, 48, 50, 52, 54, 56, and 58. The data outputs 46 through 56 are each responsible for generating one character of the data to be displayed at the display unit 24, and are each connected by a display decoder 70 to an alphanumeric display member or device 72. Although not illustrated in the drawings, each of the outputs 46 through 56 will, in most applications, be comprised of four or more conductors which will carry binary coded information or signals to the decoder 70. The decoder 70 converts such information into a form usable by the alphanumeric display device 72, and may be a commercially available unit, such as Circuit Type SN 5446A sold by Texas Instruments, Incorporated, of Dallas, Texas.

The display device 72 may be a conventional display device that utilizes light emitting diodes or other suitable means to generate alphanumeric characters. It may further include well known circuitry for causing intermittent operation or "blinking" of the character display for example, to promote a new or specially priced item on a store shelf. The data output 44 is shown directly connected to the display device 70 and could carry an enabling signal from the shift register 40 to cause such intermittent operation. Alternatively, the data output 44 may be connected to the display device 72 to control whether the display is either on or off. In such a case, blinking of one or more display units could be accomplished by periodic re-transmission of data along the line 20 to the display units, with some transmissions excluding enabling signals for the display units selected for blinking.

The shift register 40 may further include a clock or shift input 74 which receives a shift or clock pulse from a clock line 76. The clock line 76, although not shown in FIG. 1, also originates from the CPU 16, and will transmit clock pulses synchronously with the data pulses transmitted along data line 22.

The data output 58 of the shift register 40 is connected to the input of the shift register 40 of an adjacent display unit, partially seen to the right in FIG. 2. Although the display units 24 are shown somewhat close together in FIG. 2, it should be appreciated that in a store the display units may actually be spaced several inches or several feet apart along the front of shelves, cabinets, bins, or the like.

Turning now to the operation of the display units 24, the CPU 16 upon command, sends a pulse train conveying new data along data line 22 and a synchronous train of clock pulses along the clock line 76. The data pulses are received at the input 42 of shift register 40 and the clock pulses are received at the shift input 74 of shift register 40. When the first data pulse is received at input 42, the corresponding clock pulse is received at input 74 and causes the first data pulse to be shifted to the data output 44. Subsequent data pulses and clock pulses are received and the data pulses from the CPU 16 are shifted along the data outputs 44 through 56, to the output 58, and from there along the data outputs of the shift register in an adjacent display unit. Each shift register 40 in the series of display units 22 thus stores the price or other data associated with one item of merchandise, and upon receipt of the required number of clock pulses, shifts that data to an adjacent shift register in the series. When the first pulses received by the first shift register have been shifted down through and stored in the last shift register in the series, each display unit then has stored in its shift register the proper price or data to be displayed at its display member 72. Those display units with an enabling signal at output 44 will blink, or proceed with whatever other special operation the display member 72 has been designed to do in response to such an enabling signal.

Although the shift registers 40 are shown having a synchronous mode of operation, relying upon a clock pulse to shift data, it should be apparent that the shift registers 40 could also be designed to have an asynchronous mode of operation and shift data upon receipt of each new data pulse without the requirement of external clock pulses.

From the foregoing, it can be seen that when the display units are connected serially, and the CPU 16 transmits, in the same order as the units are connected, pulses or signals representing data to be displayed at the display units, that each display unit will receive and display data, conveyed by its associated signal or pulses, without the requirement of address coded signals and circuitry in the display units for receiving only properly addressed signals.

Although the presently preferred embodiment of this invention has been described, it will be understood that within the purview of this invention various changes may be made within the scope of the appended claims.

What is claimed is:

1. In a store:
   a plurality of stock locations;
   a plurality of display units, each one of said display units at one of said locations;
   data transmission line means connecting said plurality of display units in series; and
   computer means, for transmitting a series of signals to said serially connected display units, each of said signals associated with and conveying data to be displayed at one of said display units, said series of signals transmitted in the same order as said serially connected display units so that at the end of the transmission of said series of signals, each of said display units has received its associated signal.

2. The invention of claim 1, wherein each of said display units includes storage means for receiving and storing one signal in said series of signals, and upon receiving the next signal in said series of signals, shifting said one signal to the storage means in the next of said serially connected display units.

3. The invention of claim 2, wherein said storage means comprises a shift register and each of said signals in said series of signals comprises a group of data pulses, and further including alphanumeric display means connected to said shift register and controlled by said group of data pulses stored in said shift register.

4. The invention of claim 3 wherein said computer means includes means for transmitting a shift pulse synchronously with each of said data pulses, and wherein said shift register shifts each of said data pulses, pulse by pulse, through said shift register to the next display unit in response to each said shift pulse.

5. The invention of claim 3, wherein said alphanumeric display means includes circuit means for intermittent display of characters by said alphanumeric display means.

6. The invention of claim 3, wherein said computer means includes means for transmitting an enabling signal for said alphanumeric display means with each of said signals, and means for periodically re-transmitting said series of signals and selectively omitting said enabling signal in one of said signals.

7. A system particularly adaptable for use in a store having a plurality of locations, each of said locations associated with a type of item for sale, said system comprising:
   computer means for transmitting signals along a data transmission line, each of said signals conveying data pertaining to said type of item at one of said locations; and
   a plurality of display units connected in series along said data transmission line, each of said display units at one of said locations and including alphanumeric display means and storage means for storing one of said signals and controlling said alphanumeric display means in response to said one of said signals.

8. The system of claim 7, wherein said storage means comprises a shift register.

9. The system of claim 8, wherein each of said signals comprises a group of data pulses and wherein said shift register shifts said signals, pulse by pulse, to the next of said serially connected display units.

10. The system of claim 9, wherein said computer means includes means for transmitting a shift pulse synchronously with each of said data pulses, and wherein said shift register shifts each of said data pulses through said shift register to the next display unit in response to each said shift pulse.

11. A system particularly adapted for use in a store having a plurality of locations, each of said locations associated with a type of item for sale, said system comprising:
   computer means for transmitting groups of data pulses along a data transmission line, each group conveying data pertaining to said type of item at one of said locations; and
   a plurality of display units connected in series along said data transmission line, each of said display units at one of said locations and including a shift register for storing one of said groups of data pulses and alphanumeric display means connected to said shift register and controlled by said one of said groups of data pulses stored in said shift register.

12. In a display system having a plurality of display units, with each of said display units associated with an item and having means for displaying data pertaining to said item:
   data transmission line means connecting said display units in series; and
   computer means for transmitting a series of signals along said transmission line means to said serially connected display units, each of said signals associated with one of said display units and conveying data to be displayed at said one of said display units, said series of signals transmitted in the same order as said serially connected display units so that after the transmission of said series of signals, each of said display units has received its associated signal.

* * * * *